United States Patent [19]

Tamaki

[11] Patent Number: 4,461,003
[45] Date of Patent: Jul. 17, 1984

[54] CIRCUIT ARRANGEMENT FOR PREVENTING A MICROCOMPUTER FROM MALFUNCTIONING

[75] Inventor: Kazuyoshi Tamaki, Nagoya, Japan

[73] Assignee: Nippondenso Co., Ltd., Kariya, Japan

[21] Appl. No.: 270,212

[22] Filed: Jun. 3, 1981

[30] Foreign Application Priority Data

Jun. 4, 1980 [JP] Japan ................... 55-75883

[51] Int. Cl.³ .............................................. G06F 11/00
[52] U.S. Cl. ......................................... 371/66; 371/14;
371/4; 364/900; 340/663
[58] Field of Search ................ 371/4, 14, 66; 340/663,
340/661; 364/200, 900, 424, 431

[56] References Cited

U.S. PATENT DOCUMENTS 4,016,408  4/1977  Koetzle ...................... 371/4
4,255,789  3/1981  Hartford et al. .............. 364/431

FOREIGN PATENT DOCUMENTS 53-5935   1/1978  Japan ....................... 371/66
53-63936  6/1978  Japan ....................... 371/66
54-51334  4/1979  Japan ....................... 371/66

OTHER PUBLICATIONS

Mano, M. Morris, *Computer System Architecture*, Prentice-Hall, Englewood Cliffs, New Jersey, 1976, p. 72.

*Primary Examiner*—Jerry Smith
*Assistant Examiner*—Michael R. Fleming
*Attorney, Agent, or Firm*—Cushman, Darby & Cushman

[57] ABSTRACT

In a microcomputer system arranged to operate with electrical power from a battery installed on a vehicle, the voltage of the power is detected to see whether it is below a predetermined value or not. When the voltage is below the predetermined value, a voltage detector produces an output signal which will be fed to a switching circuit formed by a D-type flip-flop. The D-type flip-flop is also responsive to a read instruction signal applied from the central processing unit of the microcomputer to a nonvolatile random access memory (RAM) thereof which is supplied with power from the battery all the time. With this arrangement, when voltage drop or sag is detected, the RAM is put in stand-by condition in which reading and writing operations are inhibited. In this stand-by condition of the RAM a central processing unit (CPU) of the microcomputer system is capable of operating as long as the power voltage is above the minimum operating voltage of the CPU.

14 Claims, 5 Drawing Figures

CIRCUIT ARRANGEMENT FOR PREVENTING A MICROCOMPUTER FROM MALFUNCTIONING

BACKGROUND OF THE INVENTION

This invention relates generally to microcomputers, and more particularly, the present invention relates to a circuit arrangement for preventing a microcomputer having an additional read-write memory, which is supplied with electrical power all the time, from malfunctioning in the case of drop or sag in the voltage of the power supply of the microcomputer.

In some conventional microcomputer systems having a random access memory (RAM), which is arranged to retain its data by receiving electrical power all the time, the central processing unit (CPU) thereof is arranged to be disabled when detecting that the voltage of the power supply is below a predetermined value. In such a conventional microcomputer arrangement, since the operating process of the microcomputer is completely deadlocked or interrupted even though the voltage of the power supply is still above the operating voltage required for the microcomputer. Therefore, for instance, in a control system requiring real time process, such as engine control of a motor vehicle, the CPU is disabled on power supply voltage sag, executing no operation.

Usually, the power supply voltage of CPUs is 5 volts, and the CPU of a microcomputer installed on a motor vehicle is supplied with power from a voltage regulator which produces a predetermined voltage output by regulating the voltage of an electric current from a battery. In such a system, when the voltage of the battery, which assumes usually 12 volts or high, drops to 5.5 to 7 volts, the voltage sag is detected to disable the microcomputer. However, interruption of the operation of the CPU may result in undesirable control of the engine. For instance, when the ignition key of the motor vehicle is turned on, a large amount of current flows from the battery to the starter motor, lowering the voltage of the battery. At this tme, the voltage of the battery is much lower than the usual voltage, i.e. 12 volts, but is usually above the minimum operating voltage of the CPU. Conventional microcomputer arrangemet having such a read-write memory is usually arranged to be disabled before the power voltage drops below the minimum operating voltage for preventing the memory from malfunctioning, i.e. writing opertion of erroneous data. However, since the CPU is disabled during starting operation of the engine in the conventional microcomputer arrangement, engine control cannot be performed during engine starting operation, while it is necessary to control the engine in accordance with various data prestored in the memory of the microcomputer.

If, however, no countermeasure were taken against such power supply voltage drop or sag, erroneous data would be apt to be written into the RAM of the microcomuter. Namely, if the voltage of the power supply drops below the minimum operating voltage of the microcomputer, during writing operation, only a portion of data is written therein, and the microcomputer does not work after the voltage of the power supply drops below the minimum operating voltage. In other words, the RAM should be put in stand-by condition as soon as the power supply voltage sag is detected.

SUMMARY OF THE INVENTION

The present invention has been developed in order to remove the above-described disadvantages and drawbacks inherent to the conventional microcomputer systems equipped with an additional RAM which is battery-backuped.

It is, therefore, an object of the present invention to provide a new and useful circuit arrangement for preventing a microcomputer from malfunctioning when the voltage of the power supply drops below a standard voltage, while the CPU of the microcomputer is capable of operating as long as the voltage of the power supply is above the minimum operating voltage thereof.

According to a feature of the present invention, voltage drop in power supply is detected to disable only the RAM so that erroneous data would not be written therein even though the power supply voltage drops below the minimum operating voltage of the CPU, the RAM being of the nonvolatile type so that its data contents would not be erased if the power supply voltage drops below the minimum operating voltage therof.

In accordance with the present invention there is provided a circuit arrangement for preventing a microcomputer from malfunctioning, said microcomputer having at least a central processing unit, a random access memory and a control bus through which control signals including read and write instruction signals are fed from said central processing unit to said random access memory, said central processing unit being arranged to receive electrical power via a switch from a battery installed on a vehicle, said random access memory being arranged to receive electrical power from said battery, said circuit arrangement comprising: (a) first means for producing an output signal when the power voltage applied to said central processing unit is below a predetermined value; an (b) second means responsive to said output signal from said first means and to one of said control signals other than said write instruction signal, for producing an output signal with which said random access memory will be put in stand-by condition.

DETAILED DESCRIPTION OF THE PREFERRED EMBODIMENT

Figure 1:
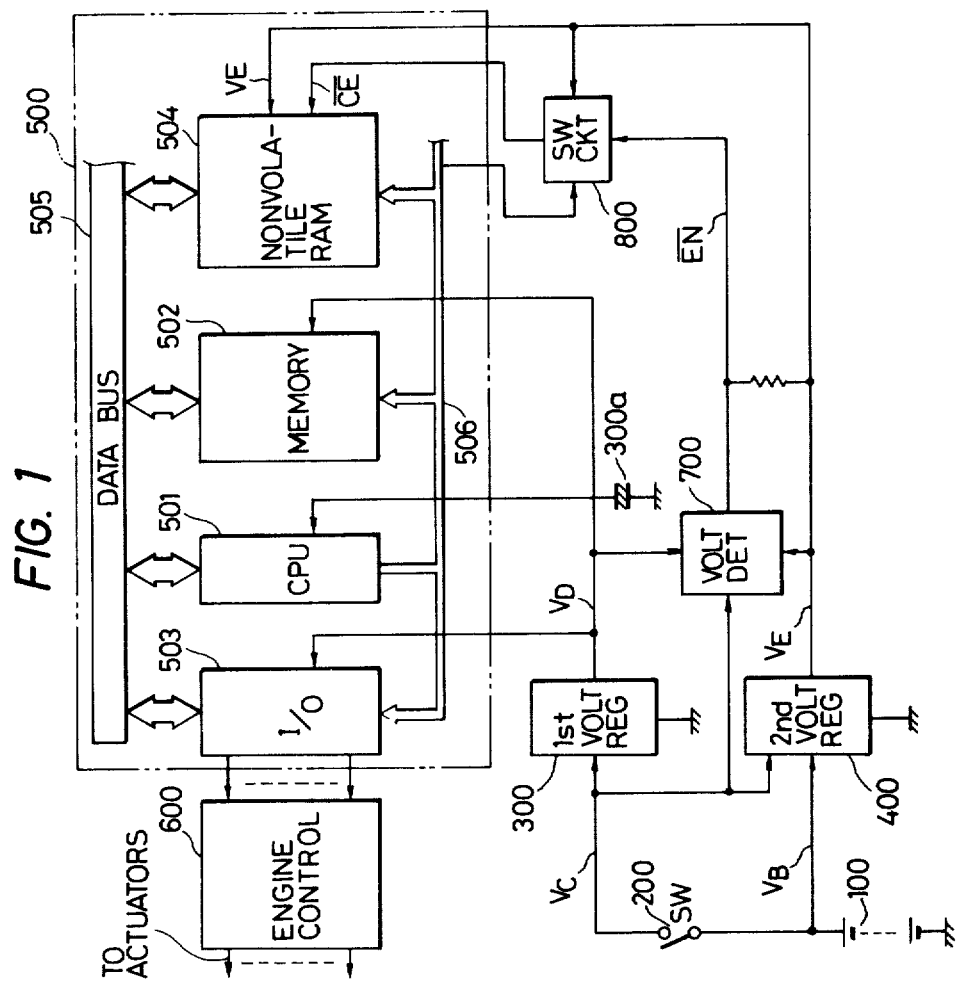
FIG. 1 is a preferred embodiment of the circuit arrangement for preventing a microcomputer from malfunctioning.

Referring now to FIG. 1, a preferred embodiment of the circuit arrangement for preventing a microcomputer from malfunctioning according to the present invention is shown. The embodiment will be described in connection with a microcomputer which is arranged to control an internal combustion engine of a motor vehicle.

A microcomputer is generally designated at a reference 500, and comprises a central processing unit (CPU) 501, a memory 502, an input-outut (I/O) device 503, a random access memory (RAM) 504, a data bus 505, and a control bus 506. RAM 504 is supplied with electrical power all the time so that the contents thereof prestored are prevented from being erased even when a main switch of the computer is turned off. therefore, RAm 504 functions as a nonvolatile memory. All these elements of the microcomputer 500 are internally connected to each other via the data bus 505, while the control bus 506 is connected between the CPU 501 and each of the memory 502, the I/O 503 and the nonvolatile RAM 504 in the same manner as in a conventional microcomputer arrangement.

The I/O 503 is connected to an engine control circuit 600 which controls, for instance, ignition timing, amount of fuel to be injected into each cylinder of the engine or the like, in accordance with data or information from the microcomputer 500. Namely, the engine control circuit 600 comprises output terminals (not shown) connected various actuators or the like.

The reference 100 indicates a battery which is installed on a motor vehicle having the above-mentioned internal combustion engine. The reference 200 indicates a switch which is interlocked with or controlled by an ignition key of the engine of the vehicle. Namely, ON-OFF operations of the switch 200 may be controlled manually. A first voltage regulator 300 or power supply circuit is connected via the switch 200 to a positive terminal of the battery 100, the negative terminal of which is connected to ground. A second voltage regulator 400 or power supply circuit is directly connected to the positive terminal of the battery 100. The voltage of the battery 100 is indicated at a referene VB, while an output voltage of the switch 200 is indicated at a reference VC, and therefoe, VB substantially equals VC when the switch 200 is closed. The output voltages of the first and second voltage regulators 300 and 400 are respectively indicated at references VD and VE. The second voltage regulator 400 is also responsive to the voltage VC from the switch 200 so as to securely operate even if a conductor between the battery 100 and the second voltage regulator 400 is undesirably disconnected or burnt out. The output voltage VD of the first voltage regulator 300 is fed to the CPU 501, the memory 502 and to the I/O 503. A capacitor 300a is connected between the output terminal of the first voltage regulator 300 and ground. The output voltage VE of the second voltage regulator 400 is fed to the nonvolatile RAM 504, a switching circuit 800 and to a voltage detector 700, the latter two of which will be described hereinlater.

The voltage detector 700 is responsive to the above-mentioned voltages VC from the switch 200, the voltage VD from the the first voltage regulator 300 and to the voltage VE from the second voltage regulator 400. A resistor is interposed between an output terminal of the voltage detector 700 and the output terminal of the second voltage detector 400. The voltage detector is supplied with electrical power from the second voltage regulator 400 so that voltage detection can be performed regardless of the state of the switch 200. The output terminal of the voltage detector 700 is connected to the above-mentioned switching cirucit 800 having an output terminal connected to the nonvolatile RAM 504. An output signal of the voltage detector 700 is indicated at a reference $\overline{EN}$, while an output signal of the switching circuit 800 is indicated at $\overline{CE}$. A line from the control bus 506 is connected to the switching circuit 800 for supplying the same with a timing signal which will be described in detail later.

Figure 2:
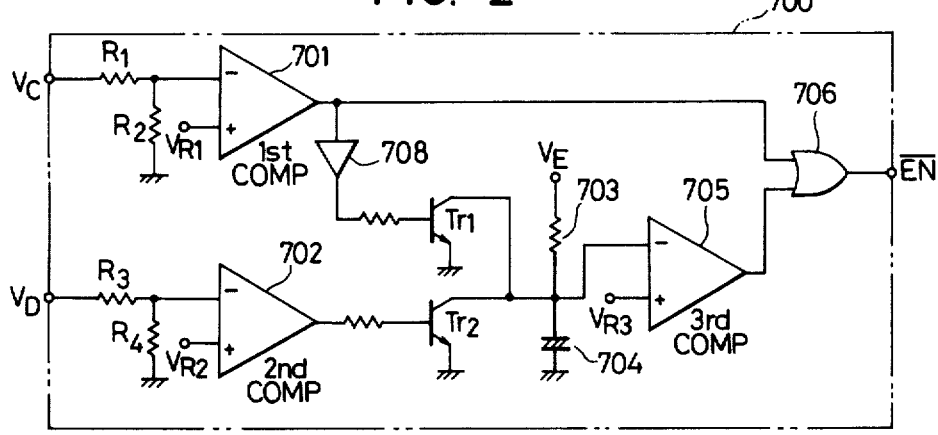
FIG. 2 is a circuit diagram of the voltage detector 700 of FIG. 1.

Reference is now made to FIG. 2 which shows a circuit diagram of the voltage detector 700 of FIG. 1. The voltage detector 700 comprises first and second comparators 701 and 702 respectively responsive to the above-mentioned voltages 5C and VD, first and second transistors Tr1 and Tr2 respectively responsive to the output signals or levels of the first and second comparators 701 and 702, a capacitor 704, a third comparator 705 responsive to the voltage across the capacitor 704, an OR gate 706, and auxiliary circuits or elements. The first to third comparators 701, 702 and 705 are also responsive to reference voltages VR1, VR2 and VR3. The output voltage VC from the first voltage regulator 300 is applied to a voltage divider formed by resistors R1 and R2, and a junction between these resistors R1 and R2 is connected to an inverting input terminal (−) of the first comparator 701. One end of the voltage divider is grounded. A noninverting input terminal (+) of the first comparator 701 is responsive to the above-mentioned reference voltage VR1. Similarly, the output voltage VD from the second voltage regulator 400 is applied via a voltage divider construted of resistors R3 and R4 to an inverting input terminal (−) of the second comparator 702 having a noninverting input terminal (+).

The output terminal of the first comparator 701 is connected to an input terminal of the OR gate 706 whose output terminal is connected to an output terminal of the voltage detector 700. The output terminal of the first comparator 701 is further connected via a buffer circuit 708 and a resistor to the base of the transistor Tr1, the emitter of which is grounded. On the other hand, the output terminal of the second comparator 702 is connected via another resistor to the base of the second transistor Tr2, the emitter of which is grounded. The collectors of the first and second transistors Tr1 and Tr2 are connected to each other, and are connected via the capacitor 704 to ground. A junction connecting the collectors and the capacitor 704 is connected via a resistor 703 to the output terminal of the second voltage regulator 400 of FIG. 1. The junction is further connected to a noninverting input terminal (−) of the third comparator 705 having an inverting input terminal (+) which is responsive to the reference voltage VR3. The output terminal of the third comparator 705 is connected to another input terminal of the OR gate 706. In the above-described arrangement, the resistor 703 and the capacitor 704 constitute a charging circuit having a given time constant, and the voltage across the capacitor 704 is detected by the third comparator 705. A detailed description of the operation of the voltage detector 700 of FIG. 2 will be provided later.

Figure 4:
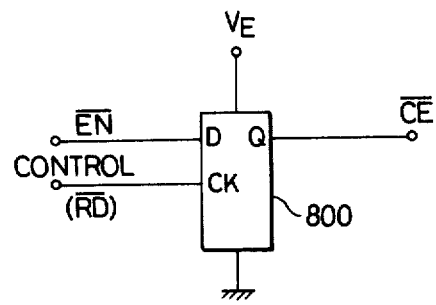
FIG. 4 is a circuit diagram of the switching circuit 800 of FIG. 1.

FIG. 4 illustrates a circuit diagram of the aforementioned switching circuit 800 of FIG. 1. The switching circuit 800 is formed by a Data-type flip-flop (No. 4013 manufactured by RCA) having a data input terminal D, a clock input terminal CK and an output terminal Q. The data input terminal D is responsive to the output singal $\overline{EN}$ from the voltage detector 700, while the clock input terminal CK is responsive to the timing or control signal from the control bus 506 of the microcomputer 500. The D flip-flop 800 is supplied with power from the second voltage regulator 700 as implied by the reference VE.

Figure 5:
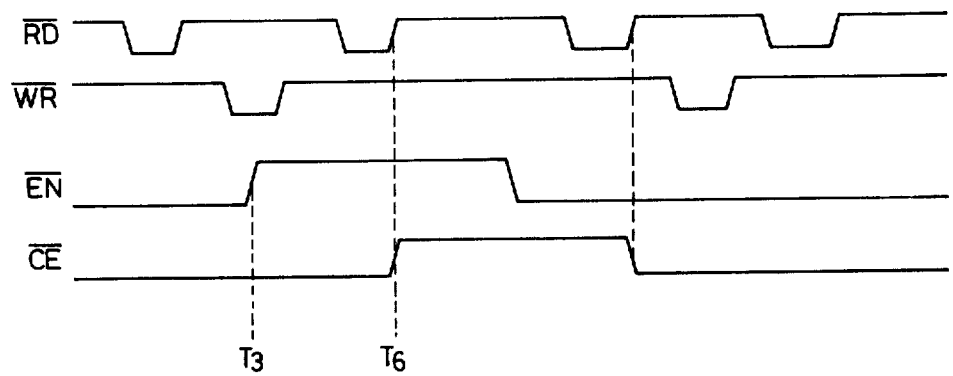

Now, the operation of the voltage detector 700 and the switching circuit 800 will be described with reference to timing charts of FIGS. 3 and 5. The voltage VC from the switch 200 is detected, after being divided by the voltage divider, by the first comparator 701, and the first comparator 701 produces a low (L) level signal at its output terminal when VC is greater than a predetermined voltage ER1 which is a multiple of the first reference voltage VR1. As the voltage VC becomes lower than ER1, the output signal of the first comparator 701 inverts to assume a high (H) level. The H level signal is transmitted via the OR gate 706 as the output signal $\overline{EN}$ of the voltage detector 700 to the switching circuit 800 (see time T3 of FIG. 3). The H level signal from the first comparator 701 is also applied via the series circuit of the buffer circuit 708 and the resistor to the base of the first transistor Tr1, putting the same in conductive state. As a result, a charge prestored in the capacitor 704 is rapidly discharged via the collector-emitter path of the first transistor Tr1. Therefore, the voltage across the capacitor 704 drops to be below the third reference voltage VR3, causing the third comparator 705 to produce a H level signal. The H level signal from the third comparator 705 is fed via the OR gate 706 to the switching circuit 800 as the output signal $\overline{EN}$ of the voltage detector 700. With this arrangement, the level of the output signal $\overline{EN}$ is securely maintained high even if the the voltage VC rises above the reference voltage ER1 instantaneously due to chattering of the switch 200 (switch bounce) until the capacitor 704 is charged via the resistor 703 by the voltage VE.

Similarly, the second comparator 702 responsive to the voltage VD from the first voltage regulator 300 produces a H level signal when VD becomes below a reference voltage ER2 which is a multiple of the second reference voltage VR2. Namely, the H level signal from the second comparator 702 causes the second transistor Tr2 to become conductive so that the charge of the capacitor 704 is also discharged via the emitter-collector path of the second transistor Tr2 (see time T5 of FIG. 3).

The above-mentioned ER1 is the threshold voltage of the first comparator 701 for detecting the voltage VC from the switch 200, and is set between 5.5 an 7 volts, while the other voltage ER2 is the threshold voltage of the second comparator 702 for detecting the regulated voltage VD from the first voltage regulator 300, and is set between 4.5 and 4.75 volts.

The first and second reference voltages VR1 and VR2 as well as the resistances of the resistors R1 to R4 are selected so that the output of the first comparator 701 becomes high before the output of the second comparator 702 becomes high in the case that the voltage VB of the battery 100 drops. Since the output terminal of the first comparator 701 is directly coupled to an input terminal of the OR gate 706, the leading edge of the signal $\overline{EN}$ comes before the regulated voltage VD starts dropping (see time T4) even when a little time delay has occurred due to the discharging operation of the capacitor 704.

On the contrary, when the voltage VC rises, i.e. when the switch 200 is turned on, the output of the first comparator 701 becomes low (see time T0) before the second comparator 702 because of the response delay of the first voltage regulator 300. At this time, the output of the second comparator 702 is of still H level (see the period between T0 and T1), maintaining the level of the output signal $\overline{En}$ of the OR gate 706 high. The voltage VD keeps rising and exceeds the reference voltage ER2, which is close to the minimum operating voltage of the CPU 501 at time T1. At T1, thus the output of the second comparator 702 turns low, causing the second transistor Tr2 to be nonconductive. The first transistor Tr1 has been nonconductive since T0, and therefore, after T1 both the first and second transistors Tr1 and Tr2 are nonconductive. Thus, the capacitor 704 starts charging from T1, and the voltage across the capacitor 704 exponentially rises. The voltage of the capacitor 704 exceeds the third reference voltage VR3 at T2 which is a given period T after T1, where the given period T is defined by the time constant of the charging circuit. Namely, the output signal $\overline{EN}$ of the voltage detector 700 turns low at T2.

Figure 3:
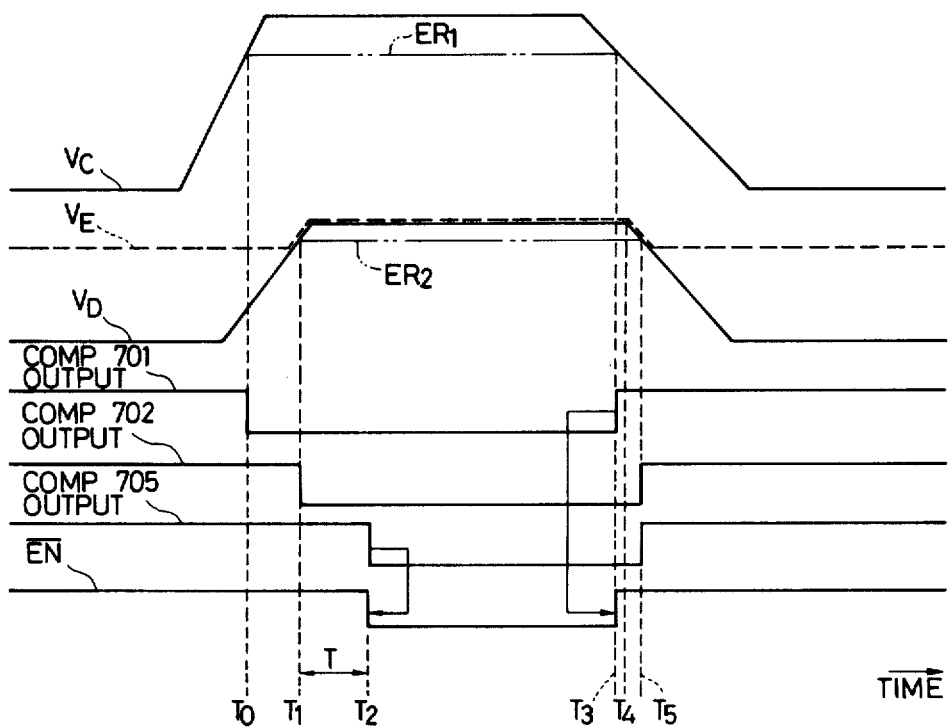
FIG. 3 and 5 are timing charts illustrating the operation of the voltage detector 700 and the switching circuit 800.

From the above description and the time chart of FIG. 3, it will be understood that the ouput signal $\overline{EN}$ of the voltage detector 700 assumes a low L level only when the regulated voltage VD is above the reference voltage ER2 which is close to the minimum operating voltage of the CPU 501, and in remaining conditions, the output signal $\overline{EN}$ is of H level. Although the operation of the voltage detector 700 has been described in connection with a case that the voltage VB of the battery 100 drops, and with a case that the same voltage rises on closure of the switch 200, similar operation will be performed when chattering of the switch 200 occurs because of the presence of the charging circuit having a time constant.

The output signal $\overline{EN}$ of the voltage detector 700 is aplied to the data input terminal D of the D flip-flop which functions as the switching circuit 800 as described with reference to FIG. 4. The operation of the D flip-flop 800 will be described with reference to a timing chart of FIG. 5. In FIG. 5, the reference $\overline{RD}$ indicates a READ instruction signal from the CPU 501, and $\overline{WR}$ indicates a WRITE instruction signal from the same. These instrution signals $\overline{RD}$ and $\overline{WR}$ are fed to the nonvolatile RAM 504 via the control bus 506, and only the READ instrction signal $\overline{RD}$ is fed to the clock input terminal CK of the D flip-flop 800. The RAM 504 is arranged to read out prestored data when the READ instruction signal assumes L level, and is further arranged to write data from the data bus 505 thereinto when the WRITE instruction signal $\overline{WR}$ is of L level. It is assumed that the output signal $\overline{EN}$ of the voltage detector 700 turns high at T3 in the same manner as in the time chart of FIG. 3. At this instant, the WRITE instruction signal $\overline{WR}$ is of L level, namely, data is now being written into the nonvolatile RAM 504. Therefore, the RAM should not be disabled or put in stand-by condition as long as the data is written thereinto. As is well knwon, D type flip-flop 800 turns its output signal in response to a clock pulse applied thereto after a data input signal has been applied. Namely, the output signal at the output terminal Q turns high in response to the leading edge of the read instruction signal $\overline{RD}$ (see T6). The high level output signal $\overline{CE}$ of the switching circuit 800 is applied to a chip-select terminal of the nonvolatile RAM 504 to put the RAM 504 on stand-by condition. Namely, the RAM 504 is disabled, and therefore, no writing and reading operations are performed even if the CPU 501 is still operating. With this arrangement and operation, the RAM 504 is preventing from receiving erroneous data. This point will be described in detail hereinbelow.

Suppose the switching circuit 800 were not provided, and the output signal $\overline{EN}$ of the voltage detector 700 is directly applied to the chip-select terminal of the RAM 504 as the stand-by signal. Under this arrangement, the level of the signal $\overline{EN}$ has a chance to be high during writing opration of the RAM 504. If the RAM 504 were disabled during writing operation, all the bits from the data bus line 505 are not necessarily written into the RAM 504. In other words, only some of the bits, such as only the MSB or more, of a digital word might be written, while successive bits are not written. This means that erroneous data, which is not expected at all, has a chance to be written into the RAM 504. If such an undesirable writing has occurred, the erroneous data might be erroneously used when the RAM 504 is reenabled, causing the microcomputer system to malfunction.

According to the present inventon, however, the stand-by signal $\overline{CE}$ is produced in response to the leading edge of the READ instruction signal $\overline{RD}$ so that the RAM 504 is put in stand-by condition during an interval other than writing operation. In this way, no erroneous data is written into the RAM 504 even if the voltage VB of the battery has dropped. In the stand-by condition, although no writing or reading opertion of the RAM 504 is performed, the CPU 501 is capable of operating if the regulated voltage VD is above the minimum operating voltage. Namely, during ON state of the starter switch of the motor vehicle the microcomputer 500 can control the engine in accordance with various information from the memory 502 and with information already read out from the nonvolatile RAM 504 unless the regulated voltage VD drops below the minimum operating voltage.

In the above-described embodiment, although the voltage detector 700 is responsive to the battery voltage VC from the switch 200 and to the regulated voltage VD from the first voltage regulator 300, it is possible to arrange the voltage detector 700 such that it detects only the regulated voltage VD to produce its output signal $\overline{EN}$. In this case, high accuracy in detection and a high detecting speed are required.

From the foregoing description, it will be understood that according to the present invention the nonvolatile RAM 504 is switched to assume stand-by condition at an instant of occurrence of a signal other than the WRITE instruction signal $\overline{WR}$, and therefore, malfunction of writing erroneous data is effectively prevented. Furthermore, the CPU 501 is capable of contineously operating in usual running condition after the RAM 504 has been put in stand-by condition as long as the regulated voltage VD is above the minimum operating voltage of the CPU 501.

The above-described embodiment is just an example of the pesent invention, and therefore, it will be understood for those skilled in the art that various modifications and variations may be made without departing from the spirit of the present invention.

What is claimed is:

1. A circuit arrangement for preventing a microcomputer from malfunctioning, said microcomputer having at least a central processing unit, a random access memory and a control bus through which control signals including read and write instruction signals are fed from said central processing unit to said random access memory, said central processing unit being arranged to receive electrical power via a switch from a battery installed on a vehicle, said random access memory being arranged to always receive electrical power from said battery, said random access memory having a chip-select terminal for receiving a stand-by signal for prohibiting reading and writing operations thereof, said circuit arrangement comprising:

first means for monitoring the voltage of said battery and producing an output signal when the voltage of said battery is below a predetermined value; and second means responsive to said output signal from said first means and to one of said control signals other than said write instruction signal, which control signal is fed via said control bus thereto, for producing said stand-by signal with which said random access memory will be put in stand-by condition in which reading and writing operations of said random access memory are prohibited, said second means producing said stand-by signal substantially simultaneously with said one of said control signals other than said write instruction signal, which control signal is arranged to exist when said write instruction signal is absent, said stand-by signal being continued as long as the battery voltage is below said predetermined value.

2. A circuit arrangement as claimed in claim 1, wherein said second means comprises a D-type flip-flop having a data input terminal responsive to said output signal from said first means, and a clock input terminal responsive to said read instruction signal from said control bus.

3. A circuit arrangement as claimed in claim 1, further comprising a voltage regulator for regulating the voltage from said battery, which voltage is applied via said switch.

4. A circuit arrangement as claimed in claim 3, wherein said first means comprises:
   (a) a first comparator responsive to the voltage from said switch and to a first reference voltage;
   (b) a second comparator responsive to the output voltage of said voltage regulator and to a second reference voltage;
   (c) a charging circuit having a given time constant, and being formed by a resistor and a capacitor which is arranged to be charged by an electrical current from said battery;
   (d) first and second semiconductor switching circuits respectively responsive to the output levels of said first and second comparators, said first and second switching circuits being connected to said charging circuit to discharge the charge of said capacitor when closed;
   (e) a third comparator responsive to a voltage across said capacitor of said charging circuit and to a third reference voltage; and
   (f) an OR gate responsive to the output level of said first comparator and to the output level of said third comparator for producing said output signal of said first means.

5. A circuit arrangement as claimed in claim 4, further comprising first and second voltage dividers for respectively dividing said voltage of said battery and said voltage from said voltage regulator 6. a circuit arrangement as claimed in claim 5, wherein said first and second reference voltages and the dividing ratios of said first and second voltage dividers are selected such that the output level of said first comparator turns before the output level of said second comparator.

7. A circuit arrangement as claimed in claim 4, wherein each of said first and second semiconductor switching circuits comprises a transistor and a resistor connected to the base of said transistor.

8. A circuit arrangement as claimed in claim 4, further comprising a buffer circuit interposed between the output terminal of said first comparator and said first semiconductor switching circuit.

9. A circuit arrangement as claimed in claim 3, further comprising a capacitor connected between the output terminal of said voltage regulator and ground.

10. A circuit arrangement as claimed in claim 1, futher comprising a second voltage regulator for regulating the voltage directly applied from said battery.

11. A circuit arrangement as claimed in claim 10, wherein said second voltage regulator is also responsive to the battery voltage applied via said switch.

12. A circuit arrangement as claimed in claim 10 or 11, wherein said first and second means are supplied with electrical power from said second voltage regulator.

13. A circuit arrangement as claimed in claim 1, wherein said switch is controlled by an ignition key of said vehicle.

14. A circuit arrangement as claimed in claim 1, wherein said switch is interlocked with an ignition key of said vehicle.

* * * * *